United States Patent [19]
Cook

[11] Patent Number: 5,259,057
[45] Date of Patent: Nov. 2, 1993

[54] WAVEGUIDE ARRAY AND METHOD FOR CONTRAST ENHANCEMENT

[75] Inventor: Lee M. Cook, Spencer, Mass.

[73] Assignee: Galileo Electro-Optics Corporation, Sturbridge, Mass.

[21] Appl. No.: 853,238

[22] Filed: Mar. 18, 1992

[51] Int. Cl.$^5$ .............................................. G02B 6/08
[52] U.S. Cl. ........................... 385/120; 385/115; 385/123
[58] Field of Search ............... 385/120, 123, 115, 116

[56] References Cited

U.S. PATENT DOCUMENTS

| | | | |
|---|---|---|---|
| 2,314,804 | 3/1943 | Willson | 385/120 |
| 2,339,928 | 1/1944 | Hood | 385/120 X |
| 3,060,789 | 10/1962 | Hicks, Jr. | 385/120 |
| 3,247,756 | 4/1966 | Siegmund | 385/120 X |
| 3,253,500 | 5/1966 | Hicks, Jr. | 385/120 |
| 3,303,374 | 2/1967 | Fyler | 385/120 |
| 3,387,959 | 6/1968 | Cole | 385/120 |
| 3,582,297 | 6/1971 | Lakeman | 385/120 X |
| 3,650,598 | 3/1972 | Kitano et al. | 385/120 X |
| 3,836,809 | 9/1974 | Condon | 385/120 |
| 3,907,403 | 9/1975 | Maeda | 385/120 |
| 4,011,007 | 3/1977 | Phaneuf et al. | 385/120 |
| 4,944,784 | 7/1990 | Kohli et al. | 65/32.3 |
| 4,989,960 | 2/1991 | Thomas | 350/448 |

OTHER PUBLICATIONS

W. Weyl et al., "On the Fluorescence of Atomic Silver in Glasses and Crystals", *J. Electrochem. Soc.*, vol. 95, pp. 70–79, 1949.

Primary Examiner—John D. Lee
Assistant Examiner—Phan T. Heartney
Attorney, Agent, or Firm—Watson, Cole, Grindle & Watson

[57] ABSTRACT

An FOFP has a darkened surface layer in the cladding portion to reduce cross-talk. One embodiment has an intagliated surface with darkened cavity walls. Darkening is achieved on a finished piece without further reworking. The surface is substantially free of fluorescence and is substantially non-conductive.

23 Claims, 1 Drawing Sheet

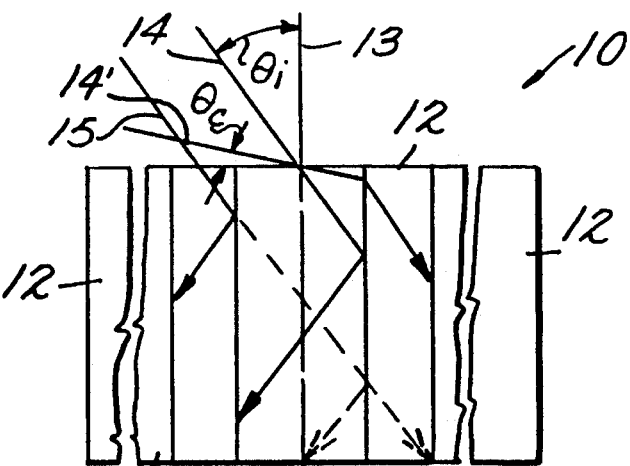
*Fig. 1.* (PRIOR ART)
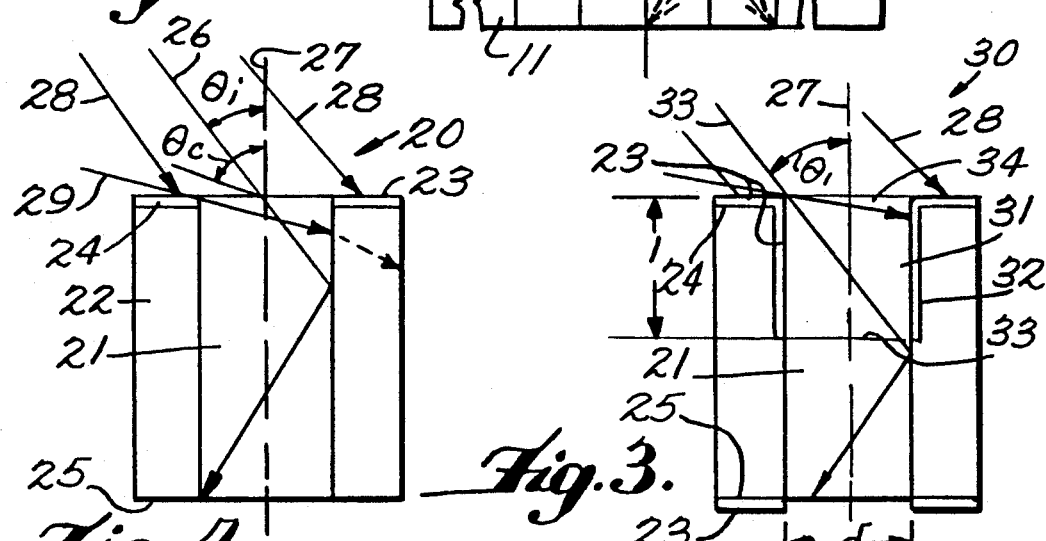
*Fig. 2.*
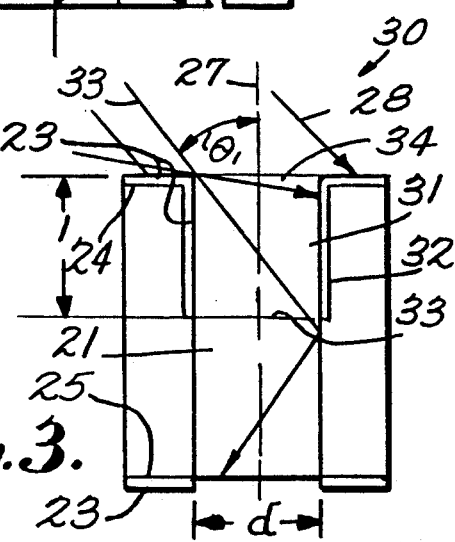
*Fig. 3.*
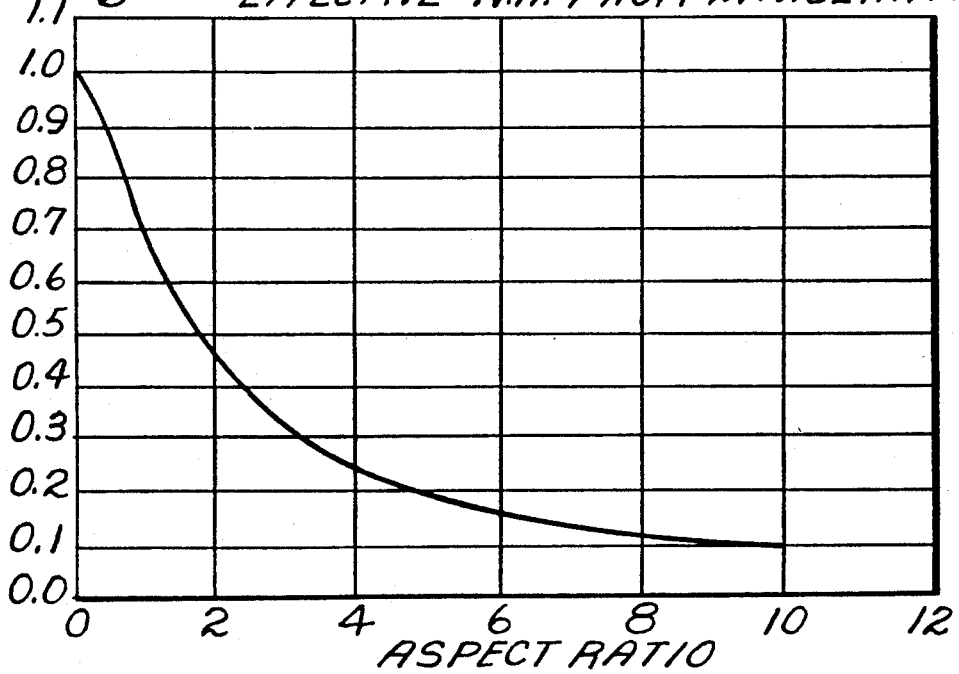
*Fig. 4.* EFFECTIVE N.A. FROM INTAGLIATION

WAVEGUIDE ARRAY AND METHOD FOR CONTRAST ENHANCEMENT

BACKGROUND OF THE INVENTION

The invention relates to Fiber Optic Face Plates. In particular, the invention relates to Fiber Optic Face Plates having integral contrast enhancement and a method for producing the same.

Fiber Optic Face Plates (FOFPs) generally consist of coherent lattice arrays of step index waveguides which act as image plane transfer devices, i.e. they "pipe" an image from the input surface to the output surface. A fragmentary cross-section of a known FOFP 10 is illustrated in FIG. 1. The structure of the FOFP 10 generally consists of a two phase array of high refractive index core glass 11, each of which is surrounded by a contiguous second phase of lower index cladding glass 12.

The glasses most commonly used for FOFPs are high refractive index lead silicates for the core material (e.g. Schott F7 or SF6) and low refractive index borosilicates for the cladding (e.g. Corning 7052). The core glass 11, with refractive index $n_1$ has a center axis 13 and is surrounded by the cladding glass 12 of a higher refractive index $n_2$. Immediately adjacent to the cladding 12 on either side are neighboring cores 11. A typical FOFP used in imaging applications utilizes waveguides packed in a hexagonal lattice with a center-to-center spacing of 6 µm and a core diameter of 5 µm. The faces of the FOFP consist of ~70% core and ~30% cladding by area.

The mode of light transmission in FOFP 10 is as follows. An incident light ray 14 at some incident angle $\theta_i$ relative to the center axis 13 enters the core 11 of the FOFP. If the sum $(90 - \theta_i)$ is greater than the critical angle for total internal reflection $\theta_c$, the incident ray 14 is not refracted into the cladding 12 but is instead completely reflected down the core 11, as shown. Incident rays 14' where the sum $(90 - \theta_i)$ is less than $\theta_c$ are refracted and pass into the cladding phase 12, where they are free to enter adjacent cores. This is the most commonly discussed mode of cross-talk between constituent fiber elements in FOFPs.

A commonly used measure of the acceptance angle of a waveguide, within which total internal refraction occurs, is the Numerical Aperture (N.A.), defined as N.A.$=\sin(90 - \theta_c) = (n_1^2 - n_2^2)^{0.5}$. Thus for the case where the N.A. of the FOFP is 1.0, $\theta_c$ is 0°, and light up to 90° off normal incidence is totally internally reflected. For the case of an N.A. of 0.5, $\theta_c$ is 60°, and incident light of up to 30° off normal incidence is totally internally reflected.

Also shown in FIG. 1 is the case where an incident ray 15 of angle $\theta_i$ enters the cladding phase 12 instead of the core. In this case, instead of being totally internally reflected, the ray 15 is partially refracted (shown as a dotted line) into the core 11. The other portion of the incident ray 15 (shown as a solid line) is reflected back into the cladding 12, which being a common phase leads to diffusion over a wide area. Portions of reflected rays also enter adjacent cores at each subsequent reflection, leading to cross-talk. This type of cross-talk is not commonly considered as a source of image quality degradation in FOFPs but it is quite significant.

Absorbing glasses are often incorporated into FOFPs to suppress cross-talk. These materials, generally termed Extra-Mural Absorbers (EMAs) are incorporated in three ways, namely: a) as absorptive coatings applied to the outside of each individual waveguide (circumferential EMA); b) a fraction of the waveguides are randomly substituted by absorbing fibers (substitutional EMA); and c) absorbing fibers are inserted into the interstitial packing vacancies in the array (interstitial EMA).

At first glance, circumferential EMA would seem to be the most effective option. In practice it is the least effective as the absorbing glasses commonly used have insufficient absorption intensity at their final thickness (<1µm) to be effective. Substitutional EMA is also ineffective and also acts as an obscuration or defect. The most effective configuration to date is interstitial EMA. Concepts for incorporation of various types of EMAs may be found in U.S. Pat. Nos. 3,060,789, 3,247,756, 3,253,500, 3,387,959 and 4,011,007.

From the above discussion it is apparent that it would be highly desirable to suppress cross-talk by preventing incident light from entering the cladding. In principle this could be done by laying down an opaque mask having holes of diameter and spacing equal to those of the cores of the elements of the FOFP. In practice this is impossible because of the high degree of misorientation and packing imperfections found in FOFPs.

The concept of darkening glass surfaces in a reducing atmosphere is known. In U.S. Pat. No. 2,314,804, glasses containing PbO or CuO are exposed to Hydrogen at elevated temperatures to create opaque surface layers which are later selectively removed by grinding and polishing to create decorative effects.

In U.S. Pat. No. 2,339,928, lead-containing fibers are exposed to hydrogen at elevated temperatures to achieve a fast color. Treatment temperature is limited to no more than 400° C.

In U.S. Pat. No. 3,650,598 high temperature reduction in Hydrogen for gradient index (GRIN) cylindrical rod optics to darken the outer walls of the cylinder and suppress cross-talk is shown. This patent is specifically restricted to GRIN optics and does not teach incorporation into an FOFP.

In U.S. Pat. No. 4,989,960, a process for blackening the perimeter of lenses in a reducing atmosphere at elevated temperature to suppress reflected stray light is shown.

The above examples either teach the general concepts of hydrogen reduction to form blackened surface layers or teach the use of such blackened layers along the outer length of a cylinder (either rod or lens) to suppress reflected stray light by absorption.

U.S. Pat. No. 3,582,297 teaches the concept of generating an opaque surface mask to prevent stray light from entering the cladding. The patent teaches the use of high temperature ion exchange of silver with constituents of the cladding glass (i.e. mobile alkali ions). The silver enriched layer is preferably reduced by hydrogen at an elevated temperature to form a relatively deep opaque surface layer (e.g. >15 µm) which then acts as a mask to prevent stray light from entering the cladding.

The resulting product and method taught by U.S. Pat. No. 3,582,297 has several significant shortcomings. Generally only a limited amount of silver may be ion-exchanged. This results in less intense absorption, requiring relatively thick surface layers to be effective. Silver ion exchange generally uses a molten salt bath or paste of silver salts. Such solutions often cause corrosion or deterioration of the polished surface layer (especially on the core glass of the composite), which degrades the optical performance of the device. Such corrosion is extremely undesirable in demanding applications such as windows for Charge Coupled Devices (CCDs), where extremely low light scattering and obscuration are desired. Silver ion exchange results in an increase in fluorescence on exposure to short wavelength radiation (ref W. Weyl et al., "On the fluorescence of atomic silver in glasses and crystals", *J. Electrochem. Soc.*, vol. 95, p. 70, 1949). Such an effect is highly undesirable in many low light imaging systems (e.g. image-intensified CCDs) where the fluorescence would significantly degrade image contrast. Silver ion exchange followed by reduction produces surfaces which are electrically conductive. This conductivity has been deliberately exploited in the prior art to produce conductive circuits on glass surfaces. Surface conductivity is highly undesirable for applications such as image intensified CCD systems where the fiberoptic must act as an insulator.

SUMMARY OF THE INVENTION

The present invention obviates and eliminates the shortcomings and limitations of the described prior arrangements. In particular, the present invention is directed to a process for treating FOFPs so as to make the cladding opaque at the surfaces without altering the surface shape or quality of the FOFP and without introducing fluorescence or electrical conductivity into the surface layer. In one embodiment this is accomplished by using a cladding glass which contains reducible cations, preferably Lead or Bismuth, in conjunction with a core glass altogether free from reducible cations or, alternatively, a core glass containing said cations but with markedly higher viscosity (i.e. $T_g$ or softening point) than the cladding glass. Fiber Optic Face Plates prepared from such a glass system are then exposed to a reducing atmosphere (e.g. Hydrogen) at an elevated temperature. Ideally this temperature should not exceed the softening point of the lowest viscosity glass component, usually the reducible glass. Exposure results in a darkening of the cladding glass at all exposed surfaces, making the cladding opaque to incident light for a small depth, typically ~1 micron. The treatment temperature is deliberately chosen such that no measurable deformation of the FOFP can occur. This allows finished devices to be so treated without the need for reshaping or refinishing. Such reworking would necessarily remove the blackened cladding layer. While the blackened cladding provides sufficient contrast improvement for most uses, it may also be utilized in conjunction with any other prior art EMA configurations to further improve image contrast.

Waveguide arrays having a cladding glass containing reducible cations (e.g. Pb, Bi, etc.) together with a core glass either free from said reducible cations or with a substantially higher glass transition temperature are exposed to a reducing atmosphere at a temperature not to exceed the softening point of the lowest viscosity glass. The exposure results in the formation of an opaque (blackened) surface layer on the cladding glass only without deformation of the shape of the object. The blackened layer is substantially free from fluorescence and electrical conductivity. The blackened cladding surfaces prevents incident light from entering the cladding and prevents light propagated into the cladding from the core during light passage through the array from exiting the array. This results in substantially improved imaging contrast.

In a particular embodiment, the invention is directed to an FOFP comprising a plurality of waveguide segments having a core and cladding lying in a parallel axial array. The cladding is preferentially reducible relative to the core. The FOFP has opposite optically finished sides exposing portions of the core and the cladding. At least one of the sides of the FOFP has a reduced cladding portion forming a darkened surface layer to a depth sufficient to absorb incident radiation directed at the cladding and render the exposed portions of the cladding opaque for enhancing contrast and reducing cross-talk.

In another embodiment, the surface of the FOFP is intagliated with a cavity for each waveguide formed in the face thereof. Each cavity has side walls formed of exposed cladding. The end of the core is recessed relative to the cladding. The exposed cladding, including the side walls of the cavity, are also reduced to produce the darkened surface layer, resulting in an effective numerical aperture which eliminates cross-talk from core incident light.

BRIEF DESCRIPTION OF THE DRAWINGS

FIG. 1 is a fragmentary side sectional view of a known Fiber Optic Face Plate incorporating a plurality of waveguides;

FIG. 2 is a fragmentary side sectional view of an FOFP according to one embodiment of the invention with illustrative ray traces;

FIG. 3 is a fragmentary side sectional view of an FOFP having an intagliated surface formed of etched cavities according to another aspect of the invention, with illustrative ray traces; and FIG. 4 is a plot of effective numerical aperture versus the aspect ratio of the etched cavities in FIG. 3.

DESCRIPTION OF THE INVENTION

One embodiment of the present invention is shown in FIG. 2. A Fiber Optic Face Plate (FOFP) 20 is formed with a plurality of waveguides (only one full waveguide is shown) having a core 21 and a cladding 22 which are glass phases. In the preferred embodiment, the cladding glass 22 contains reducible cations such as Lead, Bismuth, Arsenic or Tin or mixtures thereof. The core glass 21 is preferably altogether free of such reducible cations. Alternatively, the core glass 21 contains said cations but with a higher viscosity (i.e. $T_g$ or softening point) than the cladding glass 22. An opaque surface layer 23 is selectively formed on the outer exposed surface 24 of the cladding 22 by exposure to reducing conditions. This opaque surface layer 23, typically of thickness below 2 microns, is integral and conformal due to its mode of formation. In the embodiment described, the core glass is unreactive. Thus, there is no need to mask each core 21.

An incident ray 26 entering the core at angle $\theta_i$ relative to the center axis 27 of the core 21 shows the same total internal reflection behavior as in FIG. 1. Incident light 28 impinging on the surface layer 23 covering the cladding 22, is absorbed and cannot enter the cladding. Therefore a substantial fraction of fiber-to-fiber cross-talk is eliminated.

In a preferred embodiment the FOFP 20 is prepared prior to processing with optically finished sides or end faces 24 and 25. The formation of the opaque surface layer 23 is shown only on one side 24 but it is preferably formed on both sides 24 and 25 to further reduce cross talk and light transmitted through the cladding which may escape the cores. The optical finish remains intact after processing in accordance with the present invention. As a result the finished sides 24 and 25 of the FOFP 20 are optically equivalent before and after processing. Accordingly, advantageous processing economies are realized. For example, post processing reworking or refinishing of the FOFP is obviated.

Several examples have been prepared to demonstrate the effects of the present invention on image contrast in FOFPs.

EXAMPLE 1

Samples of Fiber Optic Face Plates were prepared from two glasses. The center-to-center spacing of waveguides in the sample was 25 µm. The core glass is substantially free from reducible cations other than trace amounts of arsenic added for refining purposes. The cladding glass contains ~29 weight % PbO. Thermal properties are:

Core glass: $T_g=525°$ C., $T_{soft}=701°$ C.
Cladding glass: $T_g=~410°$ C., $T_{soft}=630°$ C.

A sample FOFP was heat treated at 425° C. for 6 hours at under 35 mm Hydrogen pressure. This temperature is equivalent to the transition temperature Tg of the cladding glass but is well below its softening point T soft as well as the transition temperature of the core glass. Thus no deformation of the sample was expected. After reduction, the FOFP had no perceptible dimensional change due to the heat treatment and was a pleasing neutral gray. Examination under a microscope confirmed that the cladding glass had been darkened to the extent that it was opaque. An improvement in the sharpness of edges for the darkened sample over the untreated sample was observed. Light spreading into the cladding from illuminated areas was clearly evident in the unreduced sample. Stray light is completely eliminated in the reduced sample.

Comparison of light transmission at 550 nm before and after reduction showed a decrease of 30%, equivalent to the surface area fraction of the cladding glass phase. Thus, the transmission of incident light through the darkened cladding glass surface is negligible (<1%).

EXAMPLE 2

Samples of Fiber Optic Face Plates were prepared from two glasses. The center-to-center spacing of waveguides in the sample was 6 µm. The core glass contains ~10 weight % PbO. The cladding glass contains ~29 weight % PbO. Thermal properties are:

Core glass: $T_g=550°$ C., $T_{soft}=703°$ C.
Cladding glass: $T_g=~410°$ C., $T_{soft}=630°$ C.

A sample FOFP was heat treated at 425° C. for 6 hours at under 35 mm Hydrogen pressure. This temperature is well below both the transition temperature of the core glass. Thus no deformation of the sample was expected. After reduction, the FOFP had no perceptible dimensional change due to the heat treatment and was a pleasing neutral gray. Examination under a microscope confirmed that the cladding glass had been darkened to the extent that it was opaque. In contrast, the core glass was not reduced, even though it contained reducible cations. Improvement in the sharpness of edges for the darkened sample over the untreated sample was observed. Light spreading into the cladding from illuminated areas was clearly evident in the unreduced sample. The stray light was completely eliminated in the reduced sample.

As in the first example, the decrease in light transmission at 550 nm after reduction was 28%, equivalent to the surface area fraction of the cladding glass phase. Thus, the transmission of incident light through the darkened cladding glass surface is negligible (<1%).

The change in contrast following the reduction was also evaluated. Contrast was measured by observing a change in light intensity as a function of position in the transmitted image of a 2.5 micron wide knife edge slit at 20×magnification under diffuse illumination. Contrast is measured by the distance required to go from 5% to 95% transmission across the knife edge (i.e. decreased distance equals improved contrast). The reduced sample showed considerable improvement in contrast (5% $-95\%_{unreduced}=44.5$ microns vs. 5% $-95\%_{reduced}=30.2$ micron, >30% improvement).

Despite the improved results illustrated in Examples 1 and 2, under certain conditions an incident light ray 29 (FIG. 2) whose angle of incidence is beyond the critical angle $\theta_c$ can still cause cross-talk. This source of crosstalk becomes more pronounced as the N.A. of the FOFP is reduced (i.e. as the critical angle $\theta_c$ approaches normal incidence). Accordingly, another embodiment of the present invention, shown in FIG. 3, is effective to prevent this latter remaining source of cross-talk.

An FOFP 30 of core diameter d is exposed to chemical solutions (e.g. HF) which preferentially dissolve away the core 21 to produce a cavity 31 having wall portions 32 and a bottom 33. The walls 32 are exposed portions of the cladding 22 and the bottom 33 is the exposed end of the core 22. The cavity 31 has a depth 1. This process, known as intagliation, has been commercially employed in the television industry, primarily for the purposes of implanting phosphor compounds within the etched cavity. The quantity d/1 is known as the aspect ratio of the etched cavity 31.

The intagliated FOFP 30 is then exposed to a reducing atmosphere at elevated temperature to form an integral opaque surface layer 23 on all exposed cladding glass surfaces 24, 25 and 32 but not the exposed core. Because the incident surface of the core 21 is physically recessed within an opaque well, only incident light 33 of a maximum angle $\theta_i$, where tan $(\theta_i)=d/1$, can possibly enter the core 21. If the aspect ratio d/1 of the etched cavity 31 is adjusted such that $(90-\theta_i)$ is above the critical angle $\theta_c$ for total internal reflection, all of the light incident on the core is totally internally reflected, completely suppressing cross-talk. Light 34 having a grazing incidence is blocked by the surface layer 23 along the sidewalls of the cavity 31. As in FIG. 2, light 28 impinging on the cladding surface 23 is absorbed, eliminating that source of cross-talk as well.

In accordance with the foregoing, an effective N.A. for an FOFP may be derived based on the masking effect described above. The relationship between effective N.A. and aspect ratio d/1 is plotted in FIG. 4. In the plot, for any given core diameter d, the intagliation depth 1 necessary to produce the desired effective N.A. can be found.

This concept can be put to a variety of practical uses. First, by ensuring that the effective N.A. due to the present invention is less than the N.A. calculated from $(n_1^2-n_2^2)^{0.5}$ (i.e. the Optical N.A.), cross-talk may be entirely suppressed. For the case of an FOFP whose Optical N.A. is 1.0, any intagliation depth will suffice.

Increasing intagliation aspect ratios are required as the Optical N.A. decreases.

Alternatively, FOFPs of any desired effective N.A. may be produced from a single material, thus allowing a variety of optically different products to be manufactured from the same block of material, effecting substantial reductions in inventory and production costs. The effective N.A. can also be adjusted to any level consistent with desired off-axis noise rejection so as to suppress stray light.

While the general concepts of total internal reflection and intagliation are known in the prior art, the combination of properties taught by the present invention has not heretofore been discussed. The invention yields a surprising variety of optical effects without the deficiencies associated with prior art systems which render the achievement of such effects impractical. For example, the present invention avoids high temperature processes which can cause deformation of the two phase FOFP structure. The present invention satisfactorily achieves cross-talk reduction in an optically finished product without further processing and without optical degradation. Further, the present invention produces an electrically benign opaque coating which is nonconductive having a resistivity of >10 ohm cm, and thus does not interfere with the insulating function of an FOFP. As a result, the FOFP may be directly coupled to an image intensified CCD. Finally, the process for masking does not impart deleterious fluorescence to the FOFP which can cause loss of resolution.

While there have been described what at present are considered to be the preferred embodiments of the present invention, it will be readily apparent to those skilled in the art that various changes may be made therein without departing from the invention and it is intended in the claims to cover such changes and modifications as fall within the true spirit and scope of the invention.

What is claimed is:

1. A fiber optic face plate (FOFP) comprising:
   a plurality of waveguide segments having a core and cladding lying in a parallel axial array, said cladding being preferentially reducible relative to the core, said FOFP having opposite optically finished sides exposing portions of the core and the cladding, at least east one of the sides of the FOFP having a reduced cladding portion forming a darkened substantially non-conductive dielective surface layer to a depth sufficient to absorb incident radiation directed at the cladding and render the exposed portions of the cladding opaque for enhancing contrast and reducing cross-talk.

2. The FOFP of claim 1, wherein the cladding contains reducible cations and the core is substantially free of said cations.

3. The FOFP of claim 2, wherein the cations are selected from the group consisting of Pb, Bi, As and Sb.

4. The FOFP of claim 1, wherein the core has a substantially higher glass transition temperature is exposed to a reducing atmosphere at a temperature not to exceed the softening point of the lowest viscosity glass to produce said darkened surface layer on the exposed portions of the cladding only without deformation of the shape of the FOFP.

5. The FOFP of claim 1, wherein the transmission of incident light through the surface of the cladding is less than 1%.

6. The FOFP of claim 1, wherein the surface layer is $<15\ \mu$.

7. The FOFP of claim 1, wherein said darkened surface layer is substantially nonfluorescent.

8. The FOFP of claim 1, wherein the surface layer is $<4\ \mu$.

9. The FOFP of claim 1, wherein the surface layer is $<1\ \mu$.

10. The FOFP of claim 1, wherein the core and cladding have respective glass transition temperatures $T_g$ and the $T_g$ of the core is greater than the $T_g$ of the cladding.

11. The FOFP of claim 1, wherein the cladding has a glass transition temperature $T_g$ and reduction occurs at a temperature of about 50° C. below the $T_g$ of the cladding.

12. The FOFP of claim 1, wherein the FOFP has optically finished surfaces.

13. A fiber optic face plate (FOFP) comprising:
    a plurality of waveguide segments having a core and cladding lying in a a parallel axial array, said cladding being preferentially reducible relative to the core, said FOFP having opposite optically finished sides exposing portions of the core and the cladding, at least one of the sides of the FOFP having a reduced cladding portion forming a darkened surface layer to a depth sufficient to absorb incident radiation directed at the cladding and render the exposed portions of the cladding opaque for enhancing contrast and reducing cross-talk; and wherein the core portions exposed at said at least one side of the FOFP are recessed relative to the cladding portions thereby forming an intagliated surface having cavities with wall portions extending into said FOFP formed of exposed cladding, and the darkened surface layer extends into said channels along said wall portions.

14. The FOFP of claim 13, wherein the waveguides have a nominal optical numerical aperture (NA) and cavities have a selected aspect radio d/1 where d is the diameter of the core and 1 is the length of the cavity extending into said FOFP thereby resulting is an effective NA.

15. The FOFP of claim 14, wherein the effective NA is less than the optical NA.

16. The FOFP of claim 13, wherein each of said optical waveguides has an effective numerical aperture.

17. A method for treating end surfaces of a Fiber Optic Face Plate (FOFP) to substantially eliminate cross-talk from light entering surfaces, said FOFP formed of a plurality of waveguide segments extending between the surfaces, each of said waveguide segments including a core surrounded by a cladding and being fused together in a parallel axial array, said cladding being a glass having reducible cations surrounding the core formed of a glass free of said cations and having a substantially higher glass transition temperature comprising the steps of:
    exposing at least one surface of the FOFP to a reducing atmosphere at a temperature sufficient to produce a darkened, substantially non-conductive dielectric surface layer less than 15 $\mu$ on the exposed surface of the cladding glass.

18. The method of claim 17, wherein the FOFP has optically finished end faces after reduction which are optically equivalent the same surfaces before reduction.

19. A method for treating the surfaces of a fiber optic formed of a plurality of waveguide segments extending between the surfaces, each of said waveguides including a core surrounded by a cladding and being fused together in a parallel axial array, to substantially eliminate cross-talk from light entering surfaces, said cladding being a glass having reducible cations surrounding the core formed of a glass free of said cations and having a substantially higher glass transition temperature comprising the steps of:

exposing the fiber optic to a reducing atmosphere at a temperature sufficient to produce a darkened, non-fluorescent surface layer to a depth sufficient for absorbing incident radiation on the exposed surface of the cladding without secondary emission.

20. A method for treating end surfaces of a Fiber Optic Face Plate (FOFP) to substantially eliminate cross-talk from light entering surfaces, said FOFP formed of a plurality of waveguide segments extending between the surfaces, each of said waveguide segments including a core surrounded by a cladding and being fused together in a parallel axial array, said cladding being a glass having reducible cations surrounding the core formed of a glass free of said ctions and having a substantially higher glass transition temperature comprising the steps of:

exposing at least one surface of the FOFP to a reducing atmosphere at a temperature sufficient to produce a darkened surface layer less than 15 $\mu$ on the exposed surface of the cladding glass; and recessing the core portions exposed at said at least one side of the FOFP relative to the cladding portions thereby forming an intagliated surface having cavities with wall portions extending into said FOFP formed of exposed cladding, and the darkened surface layer extends into said channels along said wall portions.

21. A fiber optic comprising:

a plurality of waveguide segments having a core and cladding lying in a parallel axial array, said cladding being preferentially reducible relative to the core, said fiber optic having opposite optically finished ends exposing portions of the core and the cladding, at least one of the ends of the fiber optic having a reduced cladding portion forming a darkened substantially non-conductive dielectric surface layer to a depth sufficient to absorb incident radiation directed at the cladding and render the exposed portions of the cladding opaque for enhancing contrast and reducing cross-talk.

22. A method for treating end surfaces of a fiber optic, to substantially eliminate cross-talk from light entering surfaces formed of a plurality of waveguide segments extending between the surfaces each of said waveguide segments including a core surrounded by a cladding and being fused together in a parallel axial array, said cladding being a glass having reducible cations surrounding the core formed of a glass free of said cations and having a substantially higher glass transition temperature comprising the steps of:

exposing the fiber optic to a reducing atmosphere at a temperature sufficient to produce a darkened, substantially non-conductive dielectric surface layer less than 15 $\mu$ on the exposed surface of the cladding glass.

23. A fiber optic comprising:

a plurality of waveguide segments having a core and cladding lying in a parallel axial array, said cladding being preferentially reducible relative to the core, said fiber optic having opposite optically finished sides exposing portions of the core and the cladding, at least one of the sides of the fiber optic having a reduced cladding portion forming a darkened, non-fluorescent surface layer to a depth sufficient to absorb incident radiation directed at the cladding without secondary emission, and to render the exposed portions of the cladding opaque for enhancing contrast and reducing cross-talk.

* * * * *